US011029961B2

(12) United States Patent
Kuttan

(10) Patent No.: US 11,029,961 B2
(45) Date of Patent: Jun. 8, 2021

(54) CALCULATING WAIT TIME FOR BATCH SCHEDULER JOBS

(71) Applicant: Flexera Software LLC, Itasca, IL (US)

(72) Inventor: Rajeesh Chirayath Kuttan, Victoria (AU)

(73) Assignee: Flexera Software LLC, Itasca, IL (US)

(*) Notice: Subject to any disclaimer, the term of this patent is extended or adjusted under 35 U.S.C. 154(b) by 17 days.

(21) Appl. No.: 16/133,604

(22) Filed: Sep. 17, 2018

(65) Prior Publication Data

US 2019/0034207 A1 Jan. 31, 2019

Related U.S. Application Data

(63) Continuation of application No. 15/461,202, filed on Mar. 16, 2017, now Pat. No. 10,078,520.

(51) Int. Cl.
*G06F 9/38* (2018.01)
*G06F 3/0484* (2013.01)
*G06F 9/48* (2006.01)
*G06F 9/50* (2006.01)

(52) U.S. Cl.
CPC ........ *G06F 9/3855* (2013.01); *G06F 3/04847* (2013.01); *G06F 9/3851* (2013.01); *G06F 9/4843* (2013.01); *G06F 9/5066* (2013.01)

(58) Field of Classification Search
None
See application file for complete search history.

(56) References Cited

U.S. PATENT DOCUMENTS

| 5,465,354 | A | * | 11/1995 | Hirosawa | ............ | G06F 11/3419 |
| | | | | | | 714/E11.195 |
| 5,481,698 | A | | 1/1996 | Itoh et al. | | |
| 6,289,368 | B1 | * | 9/2001 | Dentler | ............... | G06F 11/0715 |
| | | | | | | 714/E11.188 |
| 7,743,378 | B1 | * | 6/2010 | Markov | ................ | G06F 9/5044 |
| | | | | | | 718/101 |
| 8,424,003 | B2 | | 4/2013 | Degenaro et al. | | |
| 9,032,406 | B2 | | 5/2015 | Eberlein | | |
| 9,477,523 | B1 | | 10/2016 | Warman et al. | | |
| 10,318,517 | B2 | * | 6/2019 | Bektas | ................ | H04L 43/0811 |
| 2002/0026631 | A1 | * | 2/2002 | Barritz | ................ | G06F 11/3419 |
| | | | | | | 717/127 |

(Continued)

*Primary Examiner* — Eric Coleman
(74) *Attorney, Agent, or Firm* — Knobbe, Martens, Olson & Bear, LLP

(57) ABSTRACT

Various embodiments are described herein that relate to computer programs and computer-implemented techniques for predicting when jobs in the queue of a batch scheduler will be completed. More specifically, various embodiments are described herein that relate to mechanisms for predicting the wait time and/or the estimated time to completion for jobs that are to be executed by a software asset management platform. For example, heuristics and algorithms could be used to discover when execution of a job is likely to begin and/or end. The estimated time to completion for a given job can be estimated by summing the expected execution time of the given job and the expected execution times of any jobs to be executed prior to the given job, while the wait time for a given job can be estimated by summing the expected execution times of any jobs to be executed prior to the given job.

19 Claims, 6 Drawing Sheets

(56) References Cited

U.S. PATENT DOCUMENTS

| | | | |
|---|---|---|---|
| 2004/0237088 A1* | 11/2004 | Miki | G06F 9/505 |
| | | | 718/102 |
| 2008/0066070 A1* | 3/2008 | Markov | G06F 9/4818 |
| | | | 718/103 |
| 2008/0288321 A1* | 11/2008 | Dillon | G05B 23/0283 |
| | | | 705/7.13 |
| 2009/0077235 A1 | 3/2009 | Podila et al. | |
| 2013/0007753 A1* | 1/2013 | Jain | G06F 9/46 |
| | | | 718/103 |
| 2014/0201747 A1 | 7/2014 | Pattnaik et al. | |
| 2014/0350996 A1 | 11/2014 | Iwatsuki et al. | |
| 2015/0026693 A1 | 1/2015 | Satoh et al. | |
| 2015/0095916 A1* | 4/2015 | Saga | G06F 9/4843 |
| | | | 718/102 |
| 2015/0254106 A1* | 9/2015 | Takase | G06F 9/4881 |
| | | | 718/100 |
| 2015/0262114 A1* | 9/2015 | Ming | G06Q 10/063114 |
| | | | 705/7.15 |
| 2016/0283147 A1* | 9/2016 | Ono | G06F 3/0635 |

* cited by examiner

500

Receive input at a user interface indicative of a request to initiate a particular job
501

Place the particular job in a queue of a batch scheduler
502

Determine that one or more jobs are ahead of the particular job in the queue
503

Identify a corresponding job type for each job of the one or more jobs
504

Compute an expected time to completion for the particular job
505

Post the expected time to completion for the particular job to the user interface
506

FIG. 5

CALCULATING WAIT TIME FOR BATCH SCHEDULER JOBS

CROSS-REFERENCE TO RELATED APPLICATION

This application is a continuation of U.S. application Ser. No. 15/461,202, filed on Mar. 16, 2017, which is incorporated by reference herein in its entirety.

RELATED FIELD

Various embodiments relate generally to providing feedback on when jobs are expected to be finished. More specifically, various embodiments relate to computer programs and computer-implemented techniques for predicting when jobs in a queue of a batch scheduler will be completed.

BACKGROUND

Software asset management platforms provide extensive capabilities for managing software from various vendors and desktop, laptop, and server hardware. Software asset management platforms may also provide automated, entitlement-based license optimization for software from vendors such as Adobe®, Microsoft®, and Symantec®. Accordingly, software asset management platforms are often used by end users (e.g., individuals and enterprises) to reduce ongoing software licensing costs, maintain continuous license compliance, and gain better control over software spend while reducing the time and effort required to manage software assets.

Graphical user interfaces are often used by the end users to interact with the software asset management platforms. For example, an end user may access a graphical user interface and submit a request to a software asset management platform to execute a particular job (also referred to as a "task"), such as a license reconciliation task, an import of software purchase order details, etc.

Software asset management platforms may include a computer application that controls unattended background program execution of jobs. More specifically, the computer application can represent a single point of control for defining and monitoring background executions in a distributed network of computing device in a streamlined manner. Such a computer application is often referred to as a "batch scheduler" or "job scheduler." A batch scheduler can be implemented as a Microsoft Windows® service running on a computing device (e.g., a server).

When an end user initiated a job (e.g., by submitting a request through the graphical user interface), there is no indication as to when execution of the job will begin or when the job will be finished. The end user must simply wait until execution has finished and the outcome of the job is available for review, though such a requirement may lead to a negative end user experience in interacting with the software asset management platform.

SUMMARY

Software asset management platforms may include a computer application referred to as a "batch scheduler" or "job scheduler." Said another way, a batch scheduler is a computer application that controls unattended background program execution of jobs. This is commonly called batch scheduling, while execution of jobs is commonly called batch processing.

Conventional batch schedulers typically provide a graphical user interface that may represent a single point of control for defining and monitoring background executions in a distributed network of computing devices. For example, an end user (e.g., an individual or enterprise) may use the graphical user interface to submit a request to execute a particular job. Batch schedulers prioritize jobs to be run (i.e., executed) using a data structure known as a job queue. However, when the end user initiates the particular job, there is no indication as to when execution of the job will begin or when the job will be finished.

Introduced here, therefore, are computer programs and computer-implemented techniques for predicting when jobs in the queue of a batch scheduler will be completed. More specifically, various embodiments are described herein that relate to mechanisms for predicting the estimated time to completion for jobs that are to be executed by a software asset management platform. The estimated time to completion for a given job can be estimated by summing the expected execution time of the given job and the expected execution times of any jobs to be executed prior to the given job.

Implementing the computer programs and computer-implemented techniques described herein can improve the processing capabilities of the computing device(s) that host the software asset management platform and the processing capabilities of the computing device(s) used to interact with the software asset management platform. Implementation of such computer programs and computer-implemented techniques also improves the end user experience when interacting with the software asset management platform. For example, rather than simply wait for an unknown amount of time until execution of a requested job has finished, the software asset management platform can provide an indication as to how long the end user must wait.

BRIEF DESCRIPTION OF THE DRAWINGS

One or more embodiments of the present invention are illustrated by way of example and not limitation in the figures of the accompanying drawings, in which like references indicate similar elements.

FIG. 5 depicts a process for predicting the estimated time to completion for jobs that reside within a job queue and are to be executed by a software asset management platform.

DETAILED DESCRIPTION

Introduced here are computer programs and computer-implemented techniques for predicting when jobs in the queue of a batch scheduler will be completed. More specifically, various embodiments are described herein that relate to mechanisms for predicting the wait time and/or the estimated time to completion for jobs that are to be executed by a software asset management platform. The estimated time to completion for a given job can be estimated by summing the expected execution time of the given job and the expected execution times of any jobs to be executed prior to the given job, while the wait time for a given job can be estimated by summing the expected execution times of any jobs to be executed prior to the given job.

Implementing the computer programs and computer-implemented techniques described herein can improve the processing capabilities of the computing device(s) that host the software asset management platform and the processing capabilities of the computing device(s) used to interact with the software asset management platform. Implementation of such computer programs and computer-implemented techniques also improves the end user experience when interacting with the software asset management platform. For example, rather than simply wait for an unknown amount of time until execution of a requested job has finished, the software asset management platform can provide an indication as to how long the end user must wait.

Certain software asset management platforms (e.g., Flexera FlexNet Manager®) may be mentioned herein for the purposes of illustration. Other network-accessible platforms could also be used to run computer programs that utilize a batch scheduler or host resources required by the batch scheduler. Software asset management platforms may be accessible via one or more of a web browser, mobile application, software program, or over-the-top (OTT) application. Accordingly, a software asset management platform may be accessed using any appropriate network-accessible electronic device, such as a mobile phone, tablet, personal computer, game console (e.g., Sony PlayStation® or Microsoft Xbox®), music player (e.g., Apple iPod Touch®), wearable electronic device (e.g., a watch or fitness band), network-connected ("smart") device (e.g., television), virtual/augmented reality system (e.g., Oculus Rift® or Microsoft Hololens®), or some other electronic device.

General System Overview

Figure 1:
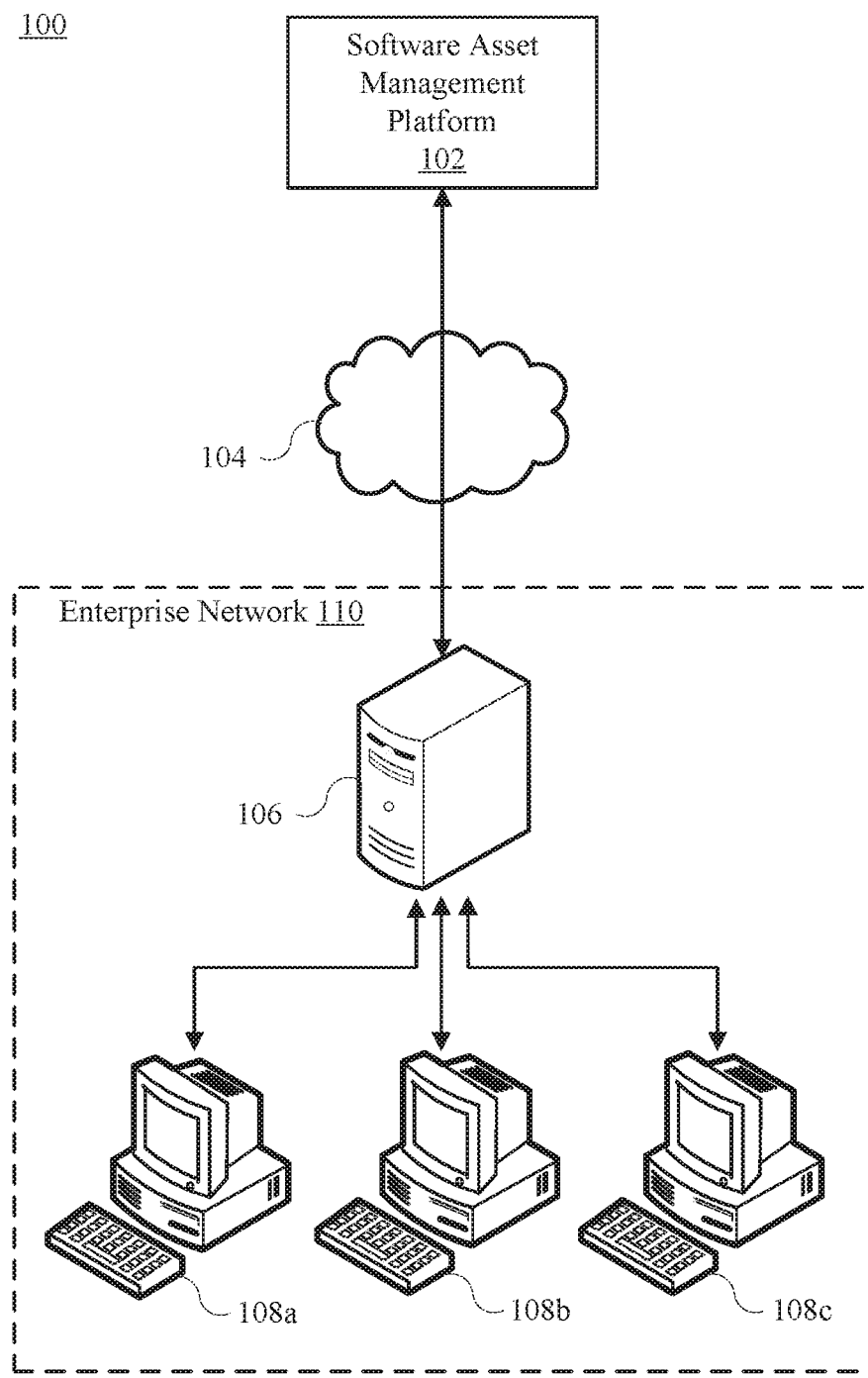
FIG. 1 is a system-level diagram of a software licensing and distribution model.

FIG. 1 is a system-level diagram of a software licensing and distribution model 100. The hallmark of software licenses is that a licensor (e.g., the software developer, publisher, or distributor) grants a licensee (e.g., an individual or enterprise) the right to use copies of software. The license agreement includes terms that define the authorized uses of the software, such as the number of installations allowed and the terms of distribution.

Software is often licensed to the licensee based on one or more criteria, such as the total number of computing devices/installations, the total (expected) usage, the desired feature(s), etc. For example, Software as a Service (SaaS) applications are often licensed to licensees on a subscription basis. When the licensee is an enterprise, the licenses are typically made accessible to one or more computing devices 108a-c associated with the enterprise. The computing device(s) 108a-c could include, for example, mobile phones, tablets, or personal computers (e.g., laptop computers or desktop computers) that are owned or operated by employees of the enterprise.

As shown in FIG. 1, the licenses may be locally hosted on a license server 106 residing within an enterprise network 110. Additionally or alternatively, the licenses may be remotely hosted by the licensor (or some other third party) on a remote license server accessible to the computing devices 108a-c across an external network 104, such as the Internet, a local area network (LAN), a wide area network (WAN), a point-to-point dial-up connection, cellular network, etc. When software is needed by a computing device (e.g., computing device 108a), the computing device can submit a request to the license server 106 for a license for the software.

However, software applications (and thus licenses) can be difficult to strategically manage, particularly as the software licensing and distribution model becomes more complex. For example, the software applications required by each computing device may vary based on the corresponding end user's role within the enterprise.

Accordingly, in some embodiments a software asset management platform 102 is responsible for managing software from various vendors and desktop, laptop, and server hardware. The software asset management platform 102 may also provide automated, entitlement-based license optimization for software applications from vendors such as Adobe®, Microsoft®, and Symantec®. Thus, the software asset management platform 102 can be used by an end user (e.g., an individual or an enterprise) to reduce ongoing software licensing costs, maintain continuous license compliance, and gain better control over software spend while reducing the time and effort required to manage software assets. The software asset management platform 102 (which resides on a computing device such as a server) may be communicatively coupled to the license server 106 and/or the computing devices 108a-c.

Figure 2:
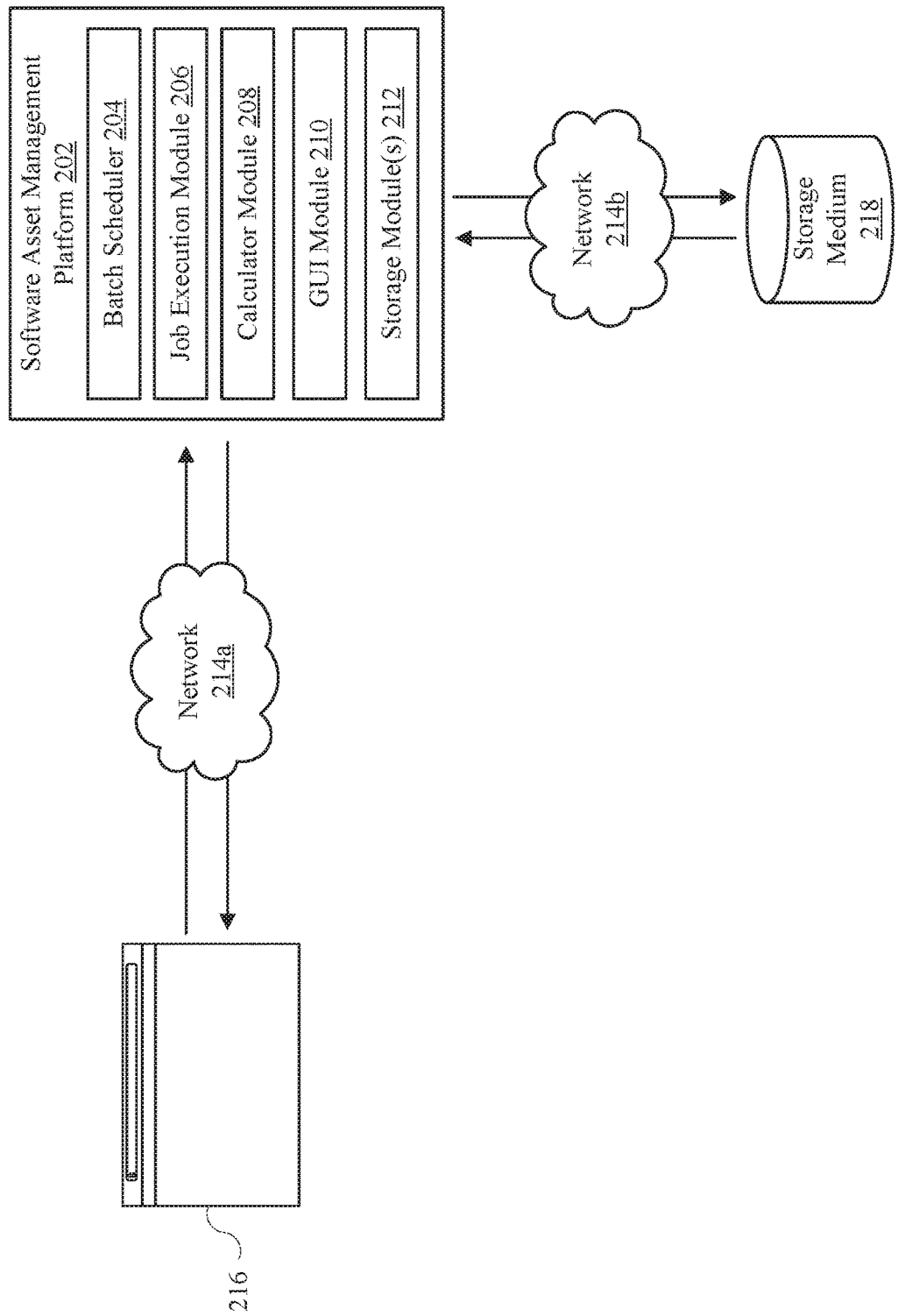
FIG. 2 depicts a system-level diagram that illustrates how an end user may interact with a software asset management platform through a graphical user interface according to some embodiments.

FIG. 2 depicts a system-level diagram that illustrates how an end user may interact with a software asset management platform 202 through a graphical user interface 216 according to some embodiments. As noted above, the software asset management platforms described herein allow for more precise management of software assets and hardware assets owned or leased by the end user.

Typically, the end user interacts with the software asset management platform 202 by logging in through the graphical user interface 216, which may be accessible via a web browser, mobile application, desktop software, or over-the-top (OTT) application. In short, the end user is able to remotely access and utilize the software asset management platform 202 by forming a connection between the graphical user interface 216 and the computing device on which the software asset management platform 202 resides (e.g., a server) over a network 214a.

The end user can access the graphical user interface 216 and request that the software asset management platform 202 perform a job (also referred to as a "task"). In some embodiments, the graphical user interface 216 prompts the end user to enter login credentials (e.g., preexisting credentials used to log into other software applications accessible to the end user) that are analyzed and validated by the software asset management platform 202 prior to allowing the end user to submit the request.

The software asset management platform 202 includes a batch scheduler 204 that may be implemented, for example, as a Microsoft Windows® service. The batch scheduler 204 is responsible for streamlining the execution of jobs by controlling the unattended background execution of the jobs. However, software asset management platforms (and, more specifically, batch schedulers) conventionally do not provide any indication as to when a job will be completed when an end user initiates the job (e.g., by submitting a request through the graphical user interface 216). This causes some end users to report negative user experiences because they do not know how much longer until a given task will be completed and must simply wait until execution has finished. In fact, such issues may lessen the value provided to the end user by the software asset management platform because strategic decisions may be dependent on knowing when certain job(s) will finish. For example, an end user planning to generate a report on a compliant license position may need to wait until a license reconciliation job has been completed by the software asset management platform. Such issues are more evident in cloud-based environments, where multiple tenants may compete for system resources on a single shared software asset management platform.

Accordingly, computer programs and computer-implemented techniques are introduced here for predicting the time to completion for jobs that are to be executed by the software asset management platform 202. As further described below, a log of historical execution times is initially constructed by recording the execution times for some or all of the jobs that are executed by the software asset management platform 202. For example, a job execution module 206 may be responsible for executing job and then creating an entry for each executed job within the log of historical execution times.

Each entry may include a job identifier, an execution time, a job type, one or more operating characteristics (e.g., input/output (I/O) subsystem speed, central processing unit (CPU) speed, network connectivity status, network connection bandwidth, etc.), or some combination thereof. Accordingly, the log of historical execution times is embodied in an appropriate data structure, such as a table. The log of historical execution times can then be stored within a data store that is accessible to the software asset management platform 202. More specifically, the data store may reside within one or more storage modules 212 of the software asset management platform 202, a remote storage medium 218 that is accessible to the software asset management platform 202, or both.

The batch scheduler 204 prioritizes jobs to be run (i.e., executed) using a data structure known as a job queue. Therefore, when the end user initiates a particular job, the particular job is placed in the job queue maintained by the batch scheduler 204. Jobs may be automatically initiated by the software asset management platform 202 or manually initiated by the end user. For example, a job may be initiated responsive to a graphical user interface (GUI) module 210 receiving input indicative of a request to initiate the particular job at the graphical user interface 216.

After placing the particular job in the job queue of the batch scheduler 204, the software asset management platform 202 can predict the expected time to completion for the particular job based on the log of historical execution times maintained in the data store. More specifically, a calculator module 208 can apply heuristics and algorithms for predicting the estimated time to completion for pending jobs. For example, the calculator module 208 can initially determine whether any jobs are ahead of the particular job in the job queue of the batch scheduler 204. If one or more jobs are discovered, the calculator module 208 can identify a job type for each of the one or more jobs, and then compute the expected execution time for each of the one or more jobs. The expected execution time for a given job is generally derived by averaging the historical execution times maintained in the data store that are associated with the same job type as the given job. Such a technique allows two different metrics to be readily produced:

Expected Wait Time—This metric provides an indication as to when execution of the particular job will begin, and is produced by summing the expected execution times corresponding to each of the one or more jobs ahead of the particular job in the job queue.

Expected Time to Completion—This metric provides an indication as to when execution of the particular job will be completed, and is produced by summing the expected execution time corresponding to the particular job and the expected execution times corresponding to each of the one or more jobs ahead of the particular job in the job queue.

The calculator module 208 can then forward one or both of these metrics to the GUI module 210, which posts the metric(s) for review by the end user responsible for submitting the request to perform the particular job.

In some embodiments, the graphical user interface 216, software asset management platform 202, and remote storage medium 218 communicate with one another over one or more networks 214a-b, such as the Internet, a local area network (LAN), a wide area network (WAN), a point-to-point dial-up connection, a cellular network, etc. Although FIG. 2 illustrates a remote storage medium 218 that is distinct from the software asset management platform 202, some embodiments are entirely self-contained. That is, the data store could be hosted locally on the software asset management platform 202 (e.g., within one or more storage modules 212).

Note that the term "module" as used herein refers broadly to software, hardware, and/or firmware components. Modules are typically functional components that generate useful data or some other output using specified input(s). Moreover, a module may or may not be self-contained. For example, a computer program may include one or more modules, or a module can include one or more computer programs.

Figure 3:
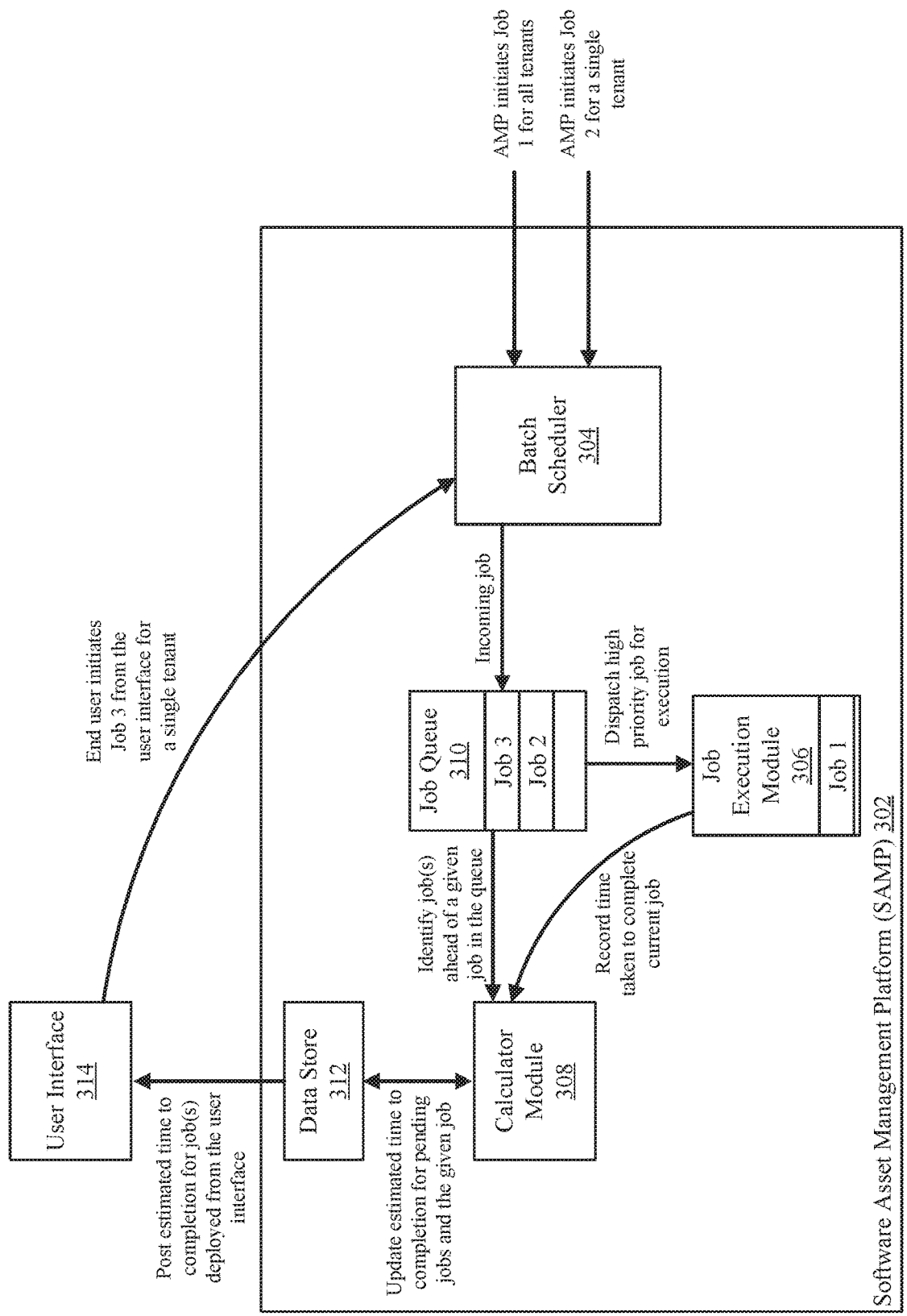
FIG. 3 is a diagrammatic illustration of a process for calculating the execution times for some or all of the tasks that are executed by a software asset management platform, and then using the execution time(s) to predict the expected time to completion for a given job.

FIG. 3 is a diagrammatic illustration of a process for calculating the execution times for some or all of the tasks that are executed by a software asset management platform 302, and then using the execution time(s) to predict the expected time to completion for a given job. At a high level, the process involves three steps: (1) jobs are executed by the software asset management platform 302; (2) the execution times for those jobs are recorded by the software asset management platform 302; and (3) the software asset management platform 302 approximates when a future job will be completed based on the execution times of previously-executed jobs. The accuracy of such an approximation can be improved by learning about the actual execution time every time a job is executed by the software asset management platform 302, and then using those actual execution times to approximate the expected execution time for jobs in a job queue 310.

For example, information may be stored in a batch scheduler 304 based on a previous run (also referred to as a "historic run") of the following tasks:

A full import run for Tenant A was completed in four (4) hours: and

A System Center Configuration Manager (SCCM) import run for Tenant A was completed in one (1) hour.

At a subsequent point in time, a BMC Atrium Discover & Dependency Mapping (ADDM) import (also referred to as a "BMC Discovery import") import may be initiated by an end user and placed in the job queue 310 of the batch scheduler 304 behind a single instance of a full import and a single instance of an SCCM import. Note that the end user may or may not be Tenant A. Assuming that the ADDM import will be executed following the full import and the SCCM import (i.e., jobs are executed by a job execution module 306 in chronological order), then the wait time for the ADDM import is five (5) hours. Meanwhile, the expected time to completion will be five (5) hours plus the expected execution time for the ADDM import. Either or both of these metrics can be shown to the end user on a user interface 314 through which the end user submitted a request for the ADDM import to be executed.

As noted above, the expected execution time for a given job will generally be derived by averaging the execution times maintained in a data store 312 that are associated with the same job type as the given job. While the example provided above includes a single value for different types of imports, multiple values often exist for a single job type. For example, the data store 312 may include separate entries noting that a first full import run was completed in four (4) hours, a second full import run was completed in five (5) hours, and a third import run was completed in four and a half (4.5) hours. In such a scenario, the expected execution time for a full import run can be calculated as follows:

$$\text{Expected Execution Time} = \frac{4 \text{ Hours} + 4.5 \text{ Hours} + 5 \text{ Hours}}{3 \text{ Instances}} = 4.5 \text{ Hours}$$

Note, however, that the expected execution time may not always be in the form of the arithmetic mean. Other mathematical and statistical models may be used. For example, an arithmetic mean may be appropriate when all external factors (also referred to as "operating characteristics") remain substantially the same because the execution time is expected to be roughly the same. However, in some embodiments weights are assigned to certain execution times so that corresponding entries in the data store 312 are weighted more heavily than others. For example, the software asset management platform 302 may assign a weight to each of the full import runs listed above based on how many operating characteristics are shared between each of those jobs and the job currently in the job queue 310.

One skilled in the art will recognize that such an approach requires that each job in the job queue 310 (or a similar job of the same type) has been previously executed at least one time so that an actual execution time is available to determine the expected execution time. Similar prediction techniques may simply substitute a value for those jobs that have not previously been executed by the job execution module 306 of the software asset management platform 302. For example, a calculator module 308 may substitute a time corresponding to a similar job or a placeholder value that is specified for each job type or a certain set of operating characteristics.

Here, for example, the software asset management platform 302 automatically initiates two jobs (i.e., Job 1 and Job 2). Each job may be performed on behalf of a single tenant of the software asset management platform 302, all tenants, or a subset of tenants. After these jobs have been completed, the task execution module 306 records an execution time for each job by creating or updating corresponding entries within a log maintained in the data store 312. The software asset management platform 302 also initiates another job (i.e., Job 3) upon receiving input indicative of a request to perform the other job at the user interface 314. After this job has been completed, the task execution module 306 records an execution time for the job by creating or updating a corresponding entry within the log. The software asset management platform 302 (and, more specifically, the task execution module 306) may record an execution time for all executed jobs or some subset thereof.

At some later point in time, the software asset management platform 302 initiates the same set of jobs (i.e., Job 1, Job 2, and Job 3). However, the software asset management platform 302 (and, more specifically, the calculator module 308) can now predict how long until each job is finished based on the actual execution times previously recorded in the data store 312.

For example, assuming the jobs are placed in, and dispatched from, the job queue 310 in the following order: Job 1-Job 2-Job 3, the calculator module 308 can calculate the expected wait time (EWT) for each job using expected execution times (EET) as follows:

EWT(Job 1)=None

EWT(Job 2)=EET(Job 1)

EWT(Job 3)=EET(Job 1)+EET(Job 2)

The expected wait time for a given job represents a prediction of how long it will take until the given job is started. Moreover, the calculator module 308 can predict the estimated time to completion (ETC) as follows:

ETC(Job 1)=EET(Job 1)

ETC(Job 2)=EET(Job 1)+EET(Job 2)

ETC(Job 3)=EET(Job 1)+EET(Job 2)+EET(Job 3)

The expected time to completion for a given job represents a prediction of how long it will take until the given job is completed.

Figure 4:
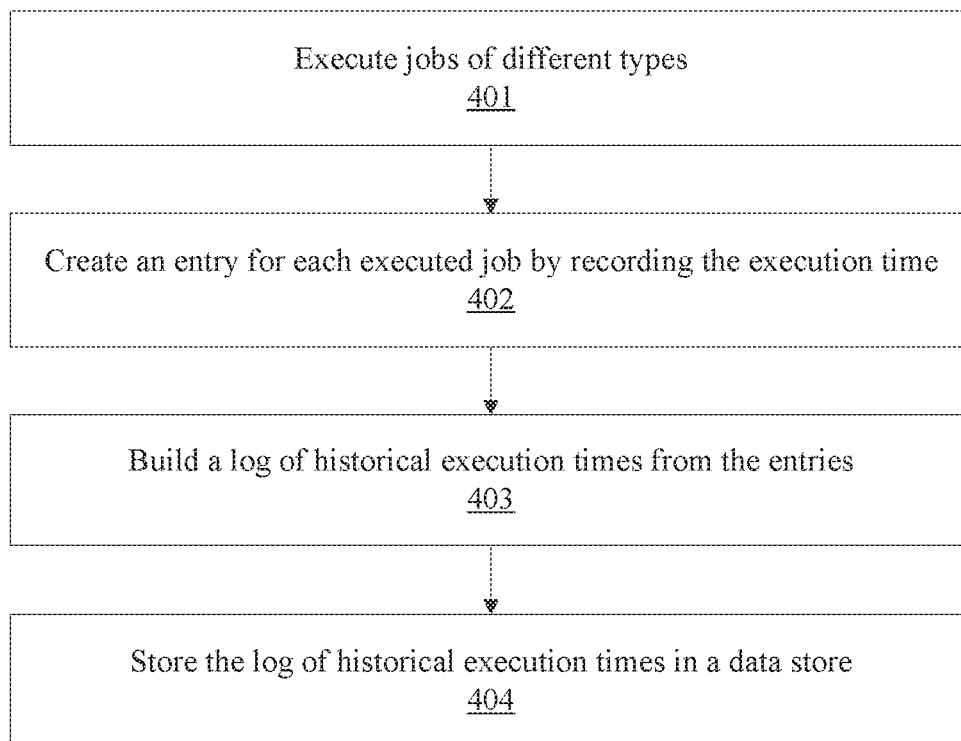
FIG. 4 depicts a process for building a log of historical execution times that can be used by a software asset management platform to predict the estimated time to completion for jobs in a job queue.

FIG. 4 depicts a process 400 for building a log of historical execution times that can be used by a software asset management platform to predict the estimated time to completion for jobs in a job queue. Jobs of different types are initially executed by the software asset management platform (step 401). The jobs may be manually initiated by an end user or automatically initiated by the software asset management platform. Moreover, the jobs may be initiated on behalf of one or more tenants of the software asset management platform. For example, a first job may be executed on behalf of a single tenant, while a second job may be executed on behalf of all tenants.

An entry can then be created for some or all of the jobs executed by the software asset management platform by recording the execution time (step 402). Each entry may also specify a job identifier, job type, one or more operating characteristics, or both. Operating characteristics may include, for example, the input/output (I/O) subsystem speed, central processing unit (CPU) speed, network connectivity status, network connection bandwidth, or some combination thereof.

A log of historical execution times can be built from the entries (step 403). The log can be constructed in several different ways. For example, in some embodiments the entries corresponding to jobs of similar job types are arranged together, while in other embodiments the entries are arranged in chronological order of execution. The log of historical execution times is then stored in a data store that is accessible to the software asset management platform (step 404). For example, the data store may be maintained locally on the software asset management platform or remotely on another network-accessible computing device.

FIG. 5 depicts a process 500 for predicting the estimated time to completion for jobs that reside within a job queue and are to be executed by a software asset management platform. The software asset management platform may initially receive input indicative of a request to initiate a particular job (step 501). The request may be submitted by an end user through a user interface that is accessible via a web browser, mobile application, desktop software, or over-the-top (OTT) application. In some embodiments, the particular job is instead automatically initiated by the software asset management platform. For example, the software asset management platform may include configuration instructions that specify certain job(s) are to be performed in accordance with a predetermined schedule.

The software asset management platform then places the particular job in a job queue of a batch scheduler (step 502). Generally, the batch scheduler dispatches jobs to a job execution module for execution in chronological order. However, in some embodiments the batch scheduler dispatches jobs to the job execution module for execution based on a priority assigned to each job. For example, time-sensitive tasks may be assigned a higher priority than non-time-sensitive tasks, and multi-tenant tasks are assigned a higher priority than single tenant tasks. As another example, the end user may be able to specify a priority ordering among jobs using a user interface.

The software asset management platform then determines whether any jobs exist in the job queue of the batch scheduler ahead of the particular job. For instance, the software asset management platform may determine that one or more jobs are ahead of the particular job in the job queue (step 503). In such scenarios, the software asset management platform identifies a corresponding job type for each job of the one or more jobs (step 504), and then derives an expected execution time for each job of the one or more jobs. The expected execution time for a given job is generally derived by averaging the execution times maintained in a log of historical execution times that are associated with the same job type as the given job. For example, the expected execution time for a full import can be predicted by averaging the actual execution time(s) corresponding to previous full imports executed by the software asset management platform.

The expected execution time can be determined in several different manners. For example, in some embodiments the calculator module of the software asset management platform may use the arithmetic mean, while in other embodiments different mathematical and/or statistical models are used. For example, the software asset management platform may assign a weight to each actual execution time used to determine the expected execution time based on how many operating characteristics are shared between each of those jobs and the job currently in the job queue.

The software asset management platform can then compute the expected time to completion for the particular job (step 505). The expected time to completion can be predicted by summing the expected execution times corresponding to the one or more jobs and the expected execution time corresponding to the particular job. The software asset management platform then posts the expected time to completion for the particular job to a user interface for review (step 506). For example, the user interface may be accessible to an end user who was responsible for submitting the request to initiate the particular job.

In some embodiments the expected time to completion is updated upon completion of each job ahead of the particular job in the job queue of the batch scheduler, while in other embodiments the expected time to completion is continually updated in accordance with a refresh rate specified by the end user or set by the software asset management platform (e.g., every 15 minutes or 30 minutes).

One skilled in the art will recognize that in some instances the software asset management platform may determine that no jobs are ahead of the particular job in the job queue. In such scenarios, the expected time to completion is simply the expected execution time for the particular job.

Unless contrary to physical possibility, it is envisioned that the steps described above may be performed in various sequences and combinations. For example, the expected execution time for each job type may be maintained and continually updated by the software asset management platform upon completing a job.

Additional steps could also be included in some embodiments. For example, in some embodiments the software asset management platform may alternatively or additionally compute an optimal expected time to completion and/or a sub-optimal expected time to completion. The optimal expected time to completion may be computed by multiplying the expected time to completion by a first factor (e.g., 0.7 or 0.8), while the sub-optimal expected time to completion may be computed by multiplying the expected time to completion by a second factor (e.g., 1.2 or 1.3). These values can be determined by comparing the current operating characteristics of the underlying computer system (e.g., I/O subsystem speed. CPU speed, network connectivity status, network connection bandwidth, etc.) with the operating characteristics of previous executions. Moreover, these values (which indicate how quickly or slowly tasks may be executed assuming a change in operating characteristics) may be posted to the user interface for review by the end user.

As another example, in some embodiments the software asset management platform may apply machine learning technique(s) to the job history of the asset management system to improve the accuracy of predicting the expected time to completion and/or the wait time for a given job. For instance, the software asset management platform may apply a Naïve Bayes Classifier algorithm, a K Means Clustering algorithm, a Support Vector Machine algorithm, linear regression, logic regression, artificial neural networks, etc. The software asset management platform can then adjust a parameter for computing the expected time to completion and/or the wait time for the given job based on the result(s) of applying the machine learning technique(s).

Processing System

Figure 6:
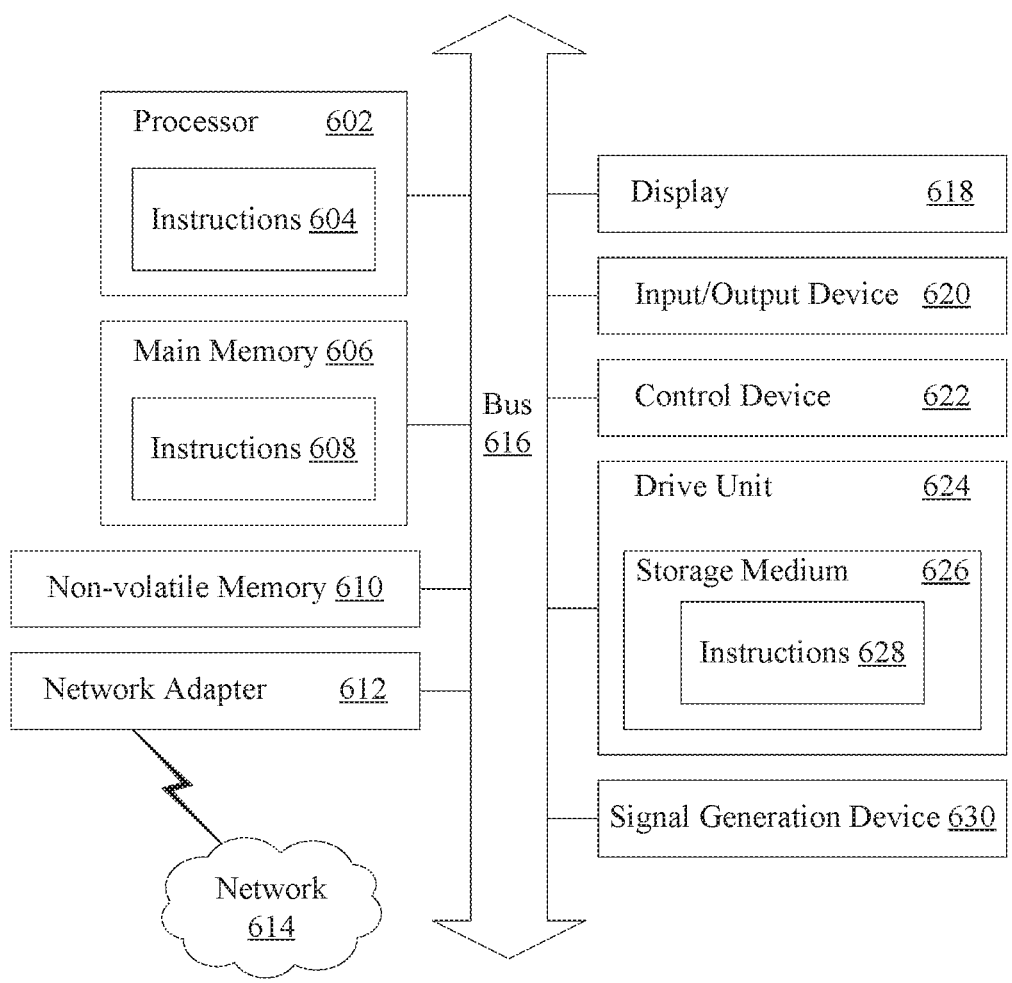
FIG. 6 is a block diagram illustrating an example of a processing system in which at least some of the operations described herein can be implemented.

FIG. 6 is a block diagram illustrating an example of a processing system 600 in which at least some operations described herein can be implemented. For example, the processing system 600 may be responsible for monitoring compliance of a licensee or managing software assets. The computing system may include one or more central processing units ("processors") 602, main memory 606, non-volatile memory 610, network adapter 612 (e.g., network interfaces), display 618, input/output devices 620, control device 622 (e.g., keyboard and pointing devices), drive unit 624 including a storage medium 626, and signal generation device 630 that are communicatively connected to a bus 616. The bus 616 is illustrated as an abstraction that represents any one or more separate physical buses, point to point connections, or both connected by appropriate bridges, adapters, or controllers. The bus 616, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 600 operates as a standalone device, although the processing system 600 may be connected (e.g., wired or wirelessly) to other machines. For example, the processing system 600 may include a terminal that is coupled directly to licensing server of a licensee. As another example, the processing system 600 may be wirelessly coupled to the licensing server.

In various embodiments, the processing system 600 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 606, non-volatile memory 610, and storage medium 626 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 628. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 604, 608, 628) set at various times in various memory and storage devices in a computer, and that, when read and executed by one or more processing units or processors 602, cause the processing system 600 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 610, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 612 enables the processing system 600 to mediate data in a network 614 with an entity that is external to the processing system 600 through any known and/or convenient communications protocol supported by the processing system 600 and the external entity. The network adapter 612 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 612 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with lanother embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A computer-implemented method comprising:
building a log of historical execution times by recording an execution time for each job of multiple jobs that are executed by a software asset management platform;
receiving input indicative of a request to initiate a particular job;
placing the particular job in a queue of a batch scheduler computer application that is executed by the software asset management platform;
computing an expected execution time for the particular job based on entries in the log of historical execution times that correspond to past jobs that are of a same type as the particular job, wherein the expected execution time is based on similarity measures reflective of how many operating characteristics are shared between respective past jobs and the particular job, and wherein the operating characteristics are indicative of characteristics associated with a computer system;
predicting an expected time to completion for the particular job based on the expected execution time; and
posting the expected time to completion for the particular job to an interface for review by a user.

2. The computer-implemented method of claim 1, further comprising:
   determining that at least one other job is ahead of the particular job in the queue of the batch scheduler computer application; and
   computing an expected execution time for each job of the at least one other job, thereby producing at least one expected execution time corresponding to the at least one other job.

3. The computer-implemented method of claim 2, wherein the expected time to completion for the particular job is established by summing the expected execution time corresponding to the particular job and the at least one expected execution time corresponding to the at least one other job.

4. The computer-implemented method of claim 2, wherein expected execution time for a given job is derived by averaging execution times maintained in the log of historical execution times that are associated with a same job type as the given job.

5. The computer-implemented method of claim 1, further comprising:
   identifying at least one execution time in the log of historical execution times,
      wherein each execution time of the at least one execution time corresponds to a past job of the same type as the particular job; and
   assigning a weight to each execution time of the at least one execution time based on an associated similarity measure,
      wherein said computing the expected execution time for the particular job is based on the at least one weighted execution time.

6. The computer-implemented method of claim 1, wherein said building the log of historical execution times comprises:
   executing jobs of different types; and
   creating an entry for each job in a data store that specifies an execution time, a job type, and one or more operating characteristics.

7. The computer-implemented method of claim 2, wherein the posted expected time to completion for the particular job is updated upon completion of each other job ahead of the particular job in the queue of the batch scheduler computer application.

8. The computer-implemented method of claim 1, wherein jobs executed by the software asset management platform are manually initiated by the user.

9. The computer-implemented method of claim 1, wherein jobs executed by the software asset management platform are automatically initiated by the software asset management platform.

10. A computer-implemented method comprising:
   receiving input indicative of a request to a software asset management platform to initiate a particular job;
   placing the particular job in a queue of a batch scheduler computer application that is executed by the software asset management platform;
   determining that an existing job is ahead of the particular job in the queue of the batch scheduler computer application;
   computing an expected time to completion for the particular job by summing an expected execution time corresponding to the existing job and an expected execution time corresponding to the particular job,
      wherein expected execution time for a given job is derived by averaging any execution times of past jobs maintained in a log of historical execution times that are associated with a same job type as the given job,
      wherein the averaging is based on similarity measures reflective of how many operating characteristics are shared between respective past jobs and the given job, and wherein the operating characteristics are indicative of characteristics associated with a computer system; and
   posting the expected time to completion for the particular job to an interface for review by a user.

11. The computer-implemented method of claim 10, wherein the log of historical execution times includes an entry for each job executed by the software asset management platform, and wherein each entry specifies an execution time, a job type, and one or more operating characteristics.

12. The computer-implemented method of claim 11,
   wherein the expected execution time corresponding to the given job are weighted, in the averaging, based on the similarity measures, and
   wherein those expected execution times corresponding to prior jobs that share at least one operating characteristic in common with the given job are weighted more heavily.

13. The computer-implemented method of claim 11, wherein the operating characteristics include input/output (I/O) subsystem speed, central processing unit (CPU) speed, network connectivity status, network connection bandwidth, or any combination thereof.

14. The computer-implemented method of claim 10, wherein the log of historical execution times is maintained in a data store that is accessible to the software asset management platform.

15. The computer-implemented method of claim 10, further comprising:
   updating the posted expected time to completion for the particular job upon completion of the existing job ahead of the particular job in the queue of the batch scheduler computer application.

16. The computer-implemented method of claim 10, further comprising:
   continually updating the posted expected time to completion for the particular job in accordance with a specified refresh rate.

17. An electronic device comprising:
   a memory that includes instructions for estimating when jobs to be executed by an asset management platform will be completed,
   wherein the instructions, when executed by a processor, cause the processor to:
      receive input indicative of a request to initiate a job;
      place the job in a queue of a batch scheduler computer application that is executed by the asset management platform;
      identify at least one execution time in a log of historical execution times that corresponds to at least one past job of a same type as the job;
      assign a weight to each execution time of the at least one execution time based on how many operating characteristics are shared between the corresponding past job of the at least one past job and the job;
      compute an expected time to completion for the job based on the at least one weighted execution time;
      compute an optimal expected time to completion for the job by multiplying the expected time to completion by a first factor;

compute a sub-optimal expected time to completion for the job by multiplying the expected time to completion by a second factor; and cause the expected time to completion, the optimal expected time to completion, the sub-optimal expected time to completion, or any combination thereof, to be posted to an interface for review.

18. The electronic device of claim 17, wherein the instructions further cause the processor to:

determine that one or more existing jobs are ahead of the job in the queue of the batch scheduler computer application;

compute one or more expected execution times for respective existing jobs;

compute the expected time to completion for the job based on the expected execution time corresponding to the job and the expected execution times corresponding to the one or more existing jobs.

19. The electronic device of claim 18, wherein said computing the expected time to completion for the job comprises:

summing an expected execution time corresponding to the job and the one or more expected execution times corresponding to the one or more existing jobs.

* * * * *